United States Patent [19]

Amat

[11] Patent Number: 5,374,975
[45] Date of Patent: Dec. 20, 1994

[54] FILM ARCHIVAL STORAGE HOLDER AND METHOD

[76] Inventor: Henry W. Amat, 101 Rockingham Ct., Longwood, Fla. 32779

[21] Appl. No.: 194,841

[22] Filed: Feb. 14, 1994

[51] Int. Cl.$^5$ .................. G03B 27/62; B65D 85/48
[52] U.S. Cl. .................................. 355/75; 206/455; 355/77
[58] Field of Search .............. 206/455; 355/75, 77; 40/364, 159

[56] References Cited

U.S. PATENT DOCUMENTS

| | | | |
|---|---|---|---|
| 3,422,557 | 1/1969 | Peters | 40/158 |
| 3,596,393 | 8/1971 | Lithgow | 40/159 |
| 3,651,591 | 3/1972 | Woodyard | 40/104.19 |
| 4,055,381 | 10/1977 | Lauer et al. | 355/75 |
| 4,118,120 | 10/1978 | Ruffner et al. | 355/75 |
| 4,170,081 | 10/1979 | Kiejzik | 40/159 |
| 4,196,536 | 4/1980 | Westberg | 40/159 |
| 4,286,869 | 9/1981 | Kogane et al. | 355/75 |
| 4,319,703 | 3/1982 | Gann | 223/106 |
| 4,421,231 | 12/1983 | McCarn | 206/388 |
| 4,533,048 | 8/1985 | Ozeki | 206/455 |
| 4,602,714 | 7/1986 | Ozeki | 206/455 |
| 4,629,070 | 12/1986 | Roberg | 206/455 |
| 5,000,319 | 3/1991 | Mermelstein | 206/455 |
| 5,031,773 | 7/1991 | Manico et al. | 206/455 |
| 5,140,764 | 8/1992 | O'Connor | 40/159 |
| 5,179,409 | 1/1993 | Kazami et al. | 355/75 |
| 5,259,504 | 11/1993 | Manico | 206/455 |

Primary Examiner—Richard A. Wintercorn

[57] ABSTRACT

A film archival storage holder comprises base and cover sheets in a laminar page configuration including a plurality of pockets formed with bonding lines for holding the film. The pockets have an opening at one end accessed through a slit in the cover sheet for placing the film within the pocket and a smaller opening at the other end for accessing the pocket and maneuvering the film into a desired position. The smaller opening prevents the film from exiting the pocket. A flap is formed between the slit and another bonding line parallel to the slit. Once in the pocket, the film is maneuvered under the flap for locking the film within the pocket. The film can be positioned between the slit and the smaller opening and the film image with unobscured view which is especially useful when making contact prints from negative film placed in the pockets. Negative film in strips of any length can be stored and maneuvered into a predetermined position for storing or exposing. Punched holes and channels are formed for storage of the holder within a binder or a hanging file.

29 Claims, 2 Drawing Sheets

FILM ARCHIVAL STORAGE HOLDER AND METHOD

BACKGROUND OF THE INVENTION

1. Field of the Invention

The invention relates generally to holders for photographic film, and more particularly to transparent holders of bare and pre sleeved film and the like, for viewing, transporting, copying and storing wherein the film is held in a predetermined position.

2. Background Art

Photographic negative film holders typically comprise a transparent page having a series of pockets within which the negative is stored. The pages are mounted in three ring binders using holes punched along an edge of the page or stored on hangers passing through a portion of the page. One major problem concerns the movement of the negative within the pocket including the negative falling out and being lost. Various negative storage pages have been developed which address this issue.

U.S. Pat. No. 4,533,048 issued to Jiro Ozeki and assigned to Slidex Corporation on Aug. 6, 1985 discloses a film jacket comprising a base sheet and transparent surface sheets affixed to the base sheet to form pockets. Cover members are affixed to the base sheet for covering extended portions of film outside the pockets, and thus holding the film at a desired position.

U.S. Pat. No. 4,602,714 issued to Jiro Ozeki and assigned to Slidex Corporation on Jul. 29, 1986 discloses a film jacket which allows insertion of a long film into a film pocket for storing the film in a predetermined position. The pockets are formed from welded portions located on the transparent page. The welded portions are separated in width slightly larger than a film width and separated in length sufficient to hold the film within the pocket formed by the welds. The welded portions are on the upper and lower sides of the film.

U.S. Pat. No. 4,629,070 issued to Paul J. Roberg on Dec. 16, 1986 discloses a transparent plastic photographic film holder containing a plurality of pockets formed by attaching two plies of transparent film by spaced bonding lines between the plies to define rectangular pockets. The pockets are formed to have two opposite closed ends and an extended openable end between the two closed ends for insertion of a negative film into the pocket. The openable end is closed off for a short distance from the opposite closed ends of the pocket for bonding the plies of film and forming a restraining lip extending from the opposite closed ends to prevent the inadvertent dislodging of a photographic film from within the pocket.

U.S. Pat. No. 5,000,319 issued to Leon Mermelstein on Mar. 19, 1991 discloses a negative storage page with locking flaps. Transparent plastic storage pages include a plurality of parallel laterally extending top loading pouches for accommodating film negatives. The top sheet of the page has a series of parallel cuts respectively disposed below the top boundary of each of the pouches and coinciding in position with sprocket holes on the film. Upper and lower flaps are thus formed. When the negatives are in place in the pouches, the slip for the pouch closes over the negative locking it into place against the row of sprocket holes, and preventing the film from falling out. Beading the page at the slit opens the pouch for retrieving the film.

SUMMARY OF INVENTION

The present invention, a film archival storage holder, comprises a base sheet of a flexible light transmitting material bonded to a transparent cover sheet formed of the flexible material. The cover sheet is affixed to and overlays a face of the base sheet to form a laminar page structure. The material is sufficiently flexible for maneuvering a film into pockets formed with the base and cover sheets. A first set of bonding lines equally spaced from each other form a set of pockets between the base and cover sheets. The pockets are dimensioned for receiving and holding a film having a width dimension and a length dimension. The film typically comprises a central image portion positioned between marginal side portions, The first bonding lines form first and second openings at each end of the pockets. A second bonding line is orthogonal to the first set of bonding lines and proximate the first opening. The second bonding line is positioned away from first ends of the first set of bonding lines thereby forming a gap between the first ends and the second bonding line. A flap for locking the film in place within each pocket is formed by a slit through the cover sheet. The slit is parallel to and separated from the second bonding line and is positioned within the gap proximate the first bonding line ends. The slit provides access to the pocket openings for placing the film into the pockets. A set of third bonding lines is placed at each of the second openings. The third bonding lines reduce the size of the second opening thereby preventing the negative film from passing therethrough. However, the reduced second opening permits access to the pocket for maneuvering the film within the pocket. The third bonding lines are separated from the slits by a dimension sufficient to position the negative film unobscured within the pocket.

A method of storing film is provided by the present invention in which the steps comprise providing a base sheet of a light transmitting material, the material sufficiently flexible for maneuvering a film into pockets formed with the base sheet, overlaying a transparent cover sheet onto a face of the base sheet for forming a laminar page structure, the cover sheet formed of the flexible material, affixing the cover sheet to the base sheet with bonding lines, providing a first set of bonding lines equally spaced from each other for forming a set of pockets between the base and cover sheets, the first bonding lines forming first and second openings at each end of the pockets, dimensioning the pockets for receiving and holding a film having a width dimension and a length dimension, the film having a central image portion positioned between marginal side portions, forming a second bonding line orthogonal to the first set of bonding lines, the second bonding line proximate the first opening, positioning the second bonding line away from first ends of the first set of bonding lines thereby forming a gap between the first ends and the second bonding line, forming a flap for locking the film in place within each pocket formed by a slit through the cover sheet, the slit parallel to and separated from the second bonding line, positioning the slit within the gap proximate the first bonding line ends, the slit providing access to the pocket openings for placing the film into the pockets, beading the slit for positioning a first end of the film into the first opening, sliding the film into the pocket through the first opening until the film is entirely within the pocket, providing a set of third bonding lines at each of the second openings for reducing a dimension of the second opening thereby preventing the film from passing therethrough, the reduced second opening permitting access to the pocket for maneuvering the film within the pocket, the third bonding lines separated from the slits by a dimension sufficient to position the film central image portion unobscured within the pocket, accessing the pocket through the second opening for maneuvering the film within the pocket, contacting the film, and maneuvering the film into a predetermined position within the pocket.

In a preferred embodiment of the invention, the pockets are dimensioned for receiving and holding a protective sleeve containing the film. The holder further comprises a fourth bonding line proximate an edge of the sheet for accommodating a hanger bar for suspending the holder.

In an alternate embodiment of the invention, a set of fifth bonding lines proximate the first openings hold the film between the slit and the third bonding lines. The fifth bonding lines are proximate one of the first bonding lines forming each pocket. The fifth bonding line reduces the dimension of the first opening but only to a reduced dimension sufficient for receiving the film.

The preferred embodiment further comprises punched holes for removably affixing the holder within a binder. The sheets are formed from synthetic polymer material of polypropylene, polyester, or polyethylene. The base sheet is either translucent material, semitransparent material, or transparent material, depending on the use of the holder. By way of example, translucent material is preferred by some in the art for holders storing positive transparencies in order to provide some background for enhancing the viewing of the transparency.

It is a primary object of the invention to provide a film storage holder having a plurality of pockets for securely holding the film in a predetermined position within the pocket. Typically, the pockets disclosed and known in the art are sufficiently large enough to accommodate the film yet dimensioned proximate the film dimension to hold the film in the predetermined position and making it more difficult for the film to fall out of the pocket as the page is handled by a user.

Development laboratories often provide developed film in protective sleeves, especially developed negative film. The sleeves are by necessity dimensioned larger than the negative film. Typically users want to keep the film in the sleeve, yet store the film in the storage pocket. Film storage pockets need to be large enough to accommodate the sleeves. It is an objective of the invention to provide a film storage holder having pockets sized to accommodate the storage negative film held in sleeves and hold bare negative film in the same pockets securely in a predetermined position within the pocket.

It is another object of the invention to provide a film storage holder having a pocket for holding the film in a position unobstructed by bonding lines or slits forming the pockets. It is further an object of the invention to provide a pocket having access into the pocket for manipulating the film.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

Figure 1:
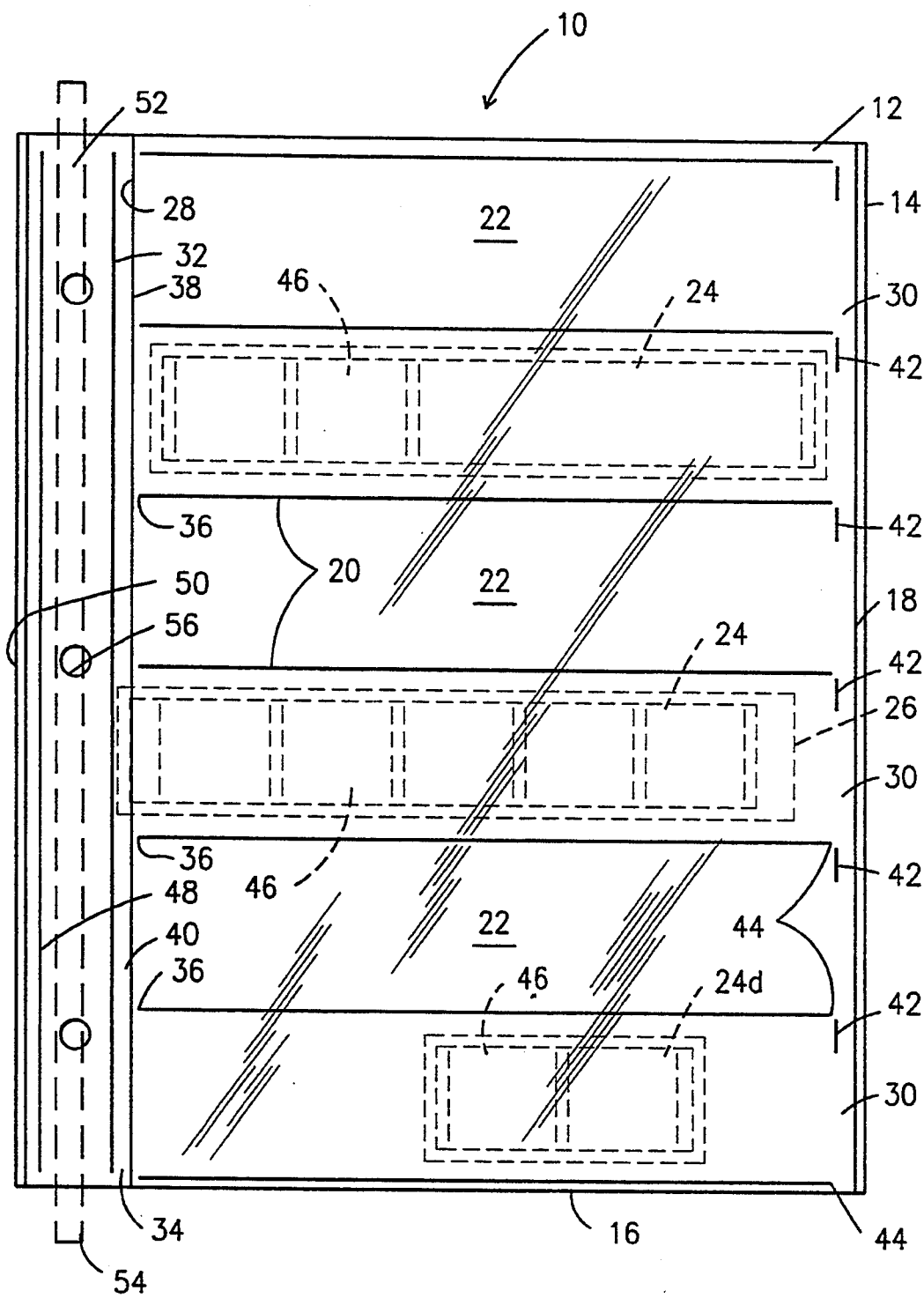
FIG. 1 is a top view of the preferred embodiment of the present invention illustrating storage of negative film.

The preferred embodiment of the present invention, a film archival storage holder 10 comprises is illustrated in FIG. 1 and comprises a cover sheet 12 overlaying a face of a base sheet 14. In the preferred embodiment, the cover sheet 12 is slightly smaller in a width dimension 16 than the base sheet 14 thereby forming a lip 18 which makes it easier to separate the cover sheet 12 from the base sheet 14 during operation of the holder 10 herein later described. The cover sheet 12 is affixed to the base sheet 14 using bonding lines well known in the art. By way of example, heat sealing techniques are used to form the bonding lines in the present invention. It is expected that ultrasonic techniques will provide effective bonding lines as well. A first set of bonding lines 20 form pockets 22. The first bonding lines are sufficiently separated for reviewing and holding film 24 and in the preferred embodiment for receiving and holding film 24 held within a protective sleeve 26. Film developers increasing are providing protective sleeves 26 for negative film 24. The pockets 22 in the preferred embodiment of the invention therefore accommodate bare film 24 and sleeves 26, and thus meet one objective of the present invention.

A first opening 28 and a second opening 30 are formed as the first bonding lines 20 are terminated. A second bonding line 32 orthogonal to the first set of bonding lines 20 is placed near but separated from the first opening 28 to form a gap 34 between the second bonding line 32 and first ends 36 of the first bonding lines 20. The cover sheet 12 has a slit 38 cut parallel the second bonding line 32 within the gap 34 and proximate the first bonding line first ends 36. The slit 38 forms a flap 40 with the second bonding line 32. As will be described later, the flap 40 is used for locking the film 24 within the pocket 22.

A set of third bonding lines 42 are placed proximate second ends 44 of the first bonding lines 20 in such a manner so as to partially close the pockets second opening 30. The partially closed second opening 30 is sufficiently small to prevent the film 24 from passing through the opening 30 but large enough to provide access into the pockets 22 for maneuvering the film 24 into a desired position. A user will typically access a pocket 22 through the opening 30 using a finger or tool (not shown).

In the preferred embodiment of the present invention, the sheets 12 and 14 are formed from polypropylene or polyethylene flexible film material because of the minimal effect to the film 24. It is anticipated that a variety of flexible plastic materials will be used such as polyester, polypropylene and polyethylene. The material used is sufficiently flexible to accommodate bending for maneuvering the film 24 into the pockets 22. The preferred embodiment of the present invention uses materials that are transparent. However, it is anticipated that semitransparent and translucent materials can be used. Such choices are made by a user to meet a specific need.

Figure 2:
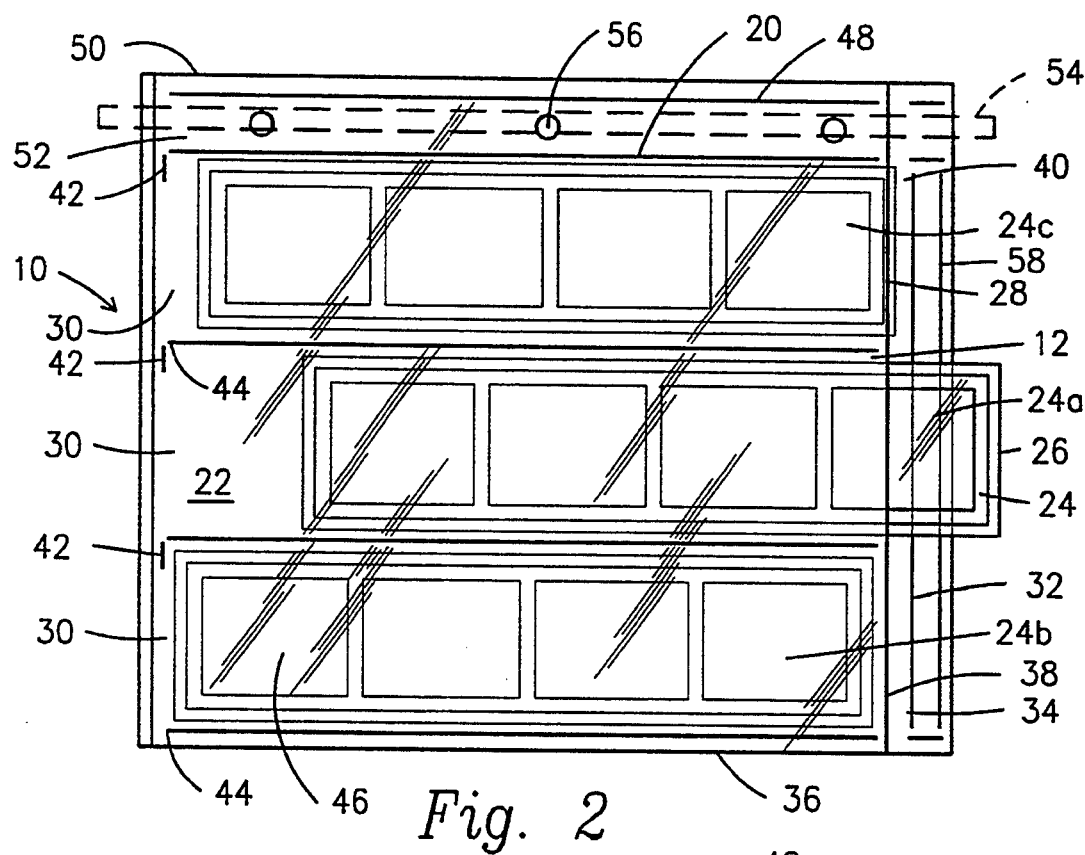
FIG. 2 is a top view of an embodiment of the present invention illustrating alternate holder configurations for accommodating alternate film sizes.

By way of example, and with reference to FIG. 2, to store a film 24, typically in strip form having multiple images 46, the film 24a is passed through the slit 38 and into the pocket 22 through the first opening 28. As further illustrated in FIG. 2, the film 24 is within protective sleeves 26 and the pockets 22 are dimensioned to accommodate the sleeves 26 as well as the film 24. Beading the cover sheet 12 at the slit 38 opens the slit 38 for easy entry of the film 24a through the first opening 28 and into the pocket 22. The film 24b is then positioned between the slit 38 and the third set of bonding lines 42 for an unobscured view of the film images 46. Such an unobscured view is very useful during the making of contact prints of the images 46 while the film 24 remains in the holder 10. In the preferred embodiment of the present invention, the dimension between the slit 38 and the third set of bonding lines 42 is sufficient to hold a typical number of images 46 or frames for the film being stored. By way of example, the holder for 35 mm film holds strips containing five frames. It is anticipated that those skilled in the art will provide holders 10 dimensioned and oriented to accommodate their needs and their film 24 of choice as illustrated in FIGS. 1 and 2. Again with reference to FIG. 2, by placing a finger or tool (not shown) through the second opening 30 for accessing the pocket 22, the film 24c is maneuvered into a position underneath the flap 40 thereby locking the film 24c in position within the pocket 22. As illustrated in FIG. 1, smaller sized film 24d is easily maneuvered into preferred positions within the pocket 22.

With continued reference to FIG. 1, a forth bonding line 48 is positioned proximate an edge 50 of the cover sheet 12 and parallel to the second bonding line 32 or as illustrated in FIG. 2, parallel to a first bonding line 20 in an alternate arrangement of the holder 10. The forth bonding line 48 forms a channel 52 between the sheets 12 and 14 for accommodating a hanger bar 54. In the preferred embodiment of the present invention, the forth bonding line 48 and second bonding line 32 together define the channel 52. As illustrated in FIG. 2, the forth bonding line 48 and one first bonding line 20 together define the channel 52. With reference to FIG. 1, holes 56 are placed between the forth 48 and second 32 bonding lines to accommodate storage of the holder 10 within a binder (not shown).

Figure 3:
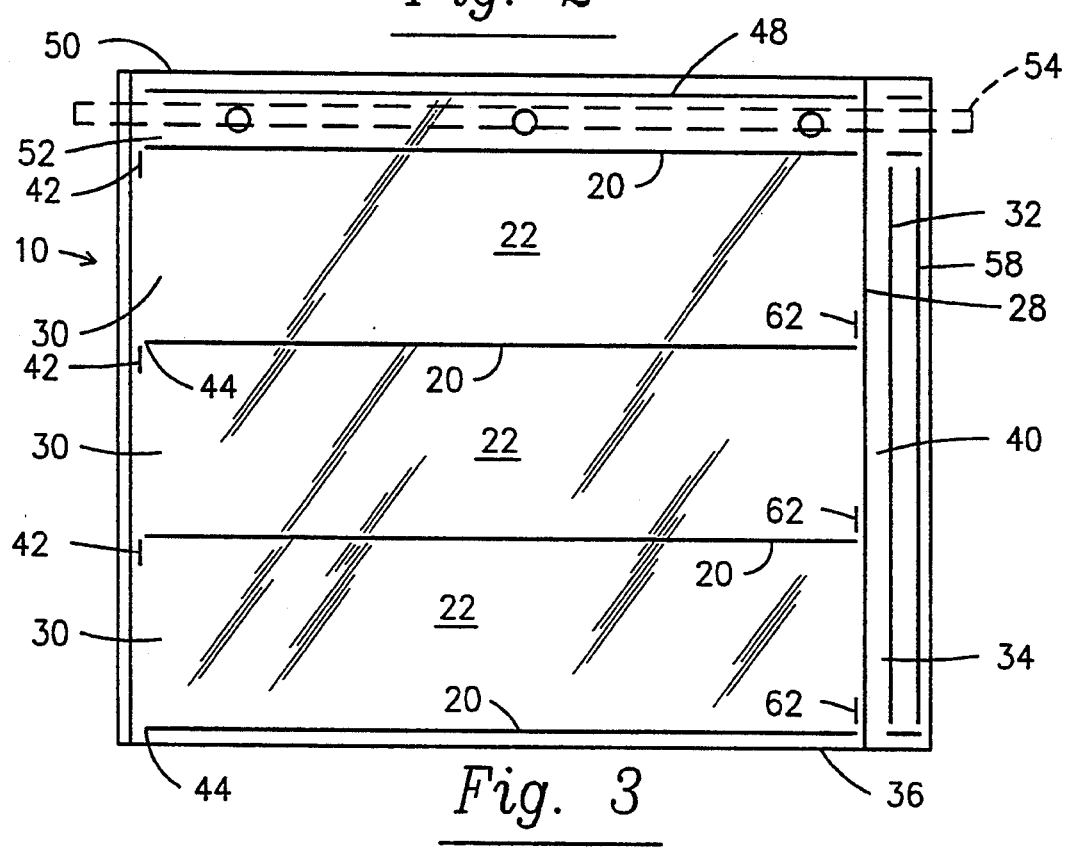
FIG. 3 is a top view of an alternate embodiment of the invention illustrating the use of bonding lines for positioning the film for an unobscured view.

With reference to FIG. 3, in an alternate embodiment of the present invention, a fifth set of bonding lines 62 is placed proximate the first openings 28 at the first ends 36 of the first bonding lines 20. In one such embodiment, one fifth bonding line 62 is placed within each pocket 22 proximate the first bonding line 20 of that pocket 22 which represents lower lines when the holder is being stored in a hanging position. In this way, film 24 will rest along the lower line and be held between the third 42 and fifth 62 bonding lines thereby holding the film 24 in the unobscured position referred to earlier. The first bonding lines 20 are sufficiently separated such that the first openings 28 can receive the film 24 and the sleeves 26.

While a specific embodiment of the invention has been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A film archival storage holder, comprising:
    a light transmitting base sheet, the sheet formed from material sufficiently flexible for protecting and maneuvering film into pockets formed with the base sheet;
    a light transmitting cover sheet affixed to the base sheet along bonding lines, the cover sheet formed from flexible material sufficiently flexible for protecting and maneuvering film into pockets formed with the cover sheet, the cover sheet overlaying a face of the base sheet thereby forming a laminar page structure;
    a first set of bonding lines equally spaced from each other, the first bonding line set forming a set of pockets between the base and cover sheets, the pockets dimensioned for receiving and holding a film having a width dimension and a length dimension, the film having a central image portion positioned between marginal side portions, the first bonding lines forming first and second openings at each end of the pockets;
    a second bonding line orthogonal to the first set of bonding lines, the second bonding line proximate the first opening, the second bonding line positioned away from first ends of the first set of bonding lines thereby forming a gap between the first ends and the second bonding line;
    a flap for locking the film in place within each pocket formed by a slit through the cover sheet, the slit parallel to and separated from the second bonding line, the slit positioned within the gap proximate the first bonding line ends, the slit providing access to the pocket openings for placing the film into the pockets; and
    a set of third bonding lines at each of the second openings, the third bonding lines reducing a dimension of the second opening thereby preventing the film from passing therethrough, the reduced second opening permitting access to the pocket for maneuvering the film within a pocket, the third bonding lines separated from the slits by a dimension sufficient to position the film unobscured within the pocket.

2. The holder as recited in claim 1, wherein the pocket is dimensioned for receiving and holding a protective sleeve containing the film.

3. The holder as recited in claim 1, further comprising a forth bonding line proximate an edge of the sheet, the forth bonding line forming a channel between the sheets for accommodating a hanger bar useful in suspending the holder.

4. The holder as recited in claim 1, further comprising a set of fifth bonding lines proximate the first openings for holding the negative film between the slit and the third bonding lines, the fifth bonding lines proximate a corresponding one of the first bonding lines forming one pocket, the fifth bonding line reducing the dimension of the first opening first opening to a reduced dimension sufficient for receiving the film.

5. The holder as recited in claim 2, further comprising a set of fifth bonding lines proximate the first openings for holding the protective sleeve between the slit and the third bonding lines, the fifth bonding lines proximate a corresponding one of the first bonding lines forming one pocket, the fifth bonding line reducing the dimension of the first opening first opening to a reduced dimension sufficient for receiving the protective sleeve.

6. The holder as recited in claim 1, further comprising means for removably affixing the holder within a binder.

7. The holder as recited in claim 1, wherein the sheets are formed from synthetic polymer material selected from the group consisting of polypropylene, polyester, and polyethylene.

8. The holder as recited in claim 1, wherein the sheets are formed from the group consisting of translucent material, semitransparent material, and transparent material.

9. A negative film archival storage holder, comprising:
  a transparent base sheet sufficiently flexible for protecting film and maneuvering the film into pockets formed with the base sheet;
  a transparent cover sheet affixed to the base sheet along bonding lines, the cover sheet formed of the flexible material, the cover sheet overlaying a face of the base sheet thereby forming a laminar page structure;
  a first set of bonding lines equally spaced from each other, the first bonding line set forming a set of pockets formed between the base and cover sheets, the pockets having a width dimension for receiving and holding a film having a width dimension and a length dimension, the film having a central image portion positioned between marginal side portions, the first bonding lines forming first and second openings at each end of the pockets;
  a second bonding line orthogonal to the first set of bonding lines, the second bonding line proximate the first opening, the second bonding line positioned away from first ends of the first set of bonding lines thereby forming a gap between the first ends and the second bonding line;
  a flap for receiving a film end and locking the film in place within each pocket formed by a slit through the cover sheet, the slit parallel to and separated from the second bonding line, the slit positioned within the gap proximate the first bonding line ends, the slit providing access to the pocket openings for placing the film into the pockets; and
  a set of third bonding lines at each of the second openings for blocking the second opening thereby preventing the film from passing therethrough, the second opening permitting access to the pocket for maneuvering the film within a pocket, each of the third bonding lines separated from the slit by a dimension sufficient to accommodate the film length dimension and provide an unobscured view of the film image portion.

10. The holder as recited in claim 9, wherein the pocket is dimensioned for receiving and holding a protective sleeve for containing the film.

11. The holder as recited in claim 9, further comprising a forth bonding line proximate an edge of the sheet, the forth bonding line forming a channel between the sheets for accommodating a hanger bar useful in suspending the holder.

12. The holder as recited in claim 9, further comprising a set of fifth bonding lines proximate the first openings for holding the negative film between the slit and the third bonding lines, each of the fifth bonding lines proximate a corresponding one of the first bonding lines forming one pocket, the fifth bonding line reducing the dimension of the first opening first opening to a reduced dimension sufficient for receiving the film.

13. The holder as recited in claim 9, wherein the sheets are formed from flexible synthetic polymer film material selected from the group consisting of polypropylene, polyester, and polyethylene.

14. A method of storing film comprising the steps of:
  providing a base sheet of a light transmitting material, the material sufficiently flexible for maneuvering a film into pockets formed with the base sheet;
  overlaying a cover sheet of light transmitting material onto a face of the base sheet for forming a laminar page structure, the cover sheet formed of the flexible material;
  affixing the cover sheet to the base sheet with bonding lines;
  providing a first set of bonding lines equally spaced from each other for forming a set of pockets between the base and cover sheets, the first bonding lines forming first and second openings at each end of the pockets;
  dimensioning the pockets for receiving and holding a film having a width dimension and a length dimension, the film having a central image portion positioned between marginal side portions;
  forming a second bonding line orthogonal to the first set of bonding lines, the second bonding line proximate the first opening;
  positioning the second bonding line away from first ends of the first set of bonding lines thereby forming a gap between the first ends and the second bonding line;
  forming a flap for locking the film in place within each pocket formed by a slit through the cover sheet, the slit parallel to and separated from the second bonding line;
  positioning the slit within the gap proximate the first bonding line ends, the slit providing access to the pocket openings for placing the film into the pockets;
  beading the slit for positioning a first end of the film into the first opening;
  sliding the film into the pocket through the first opening until the film is entirely within the pocket;
  providing a set of third bonding lines at each of the second openings for reducing a dimension of the second opening thereby preventing the film from passing therethrough, the reduced second opening permitting access to the pocket for maneuvering the film within the pocket, the third bonding lines separated from the slits by a dimension sufficient to position the film central image portion unobscured within the pocket;
  accessing the pocket through the second opening for maneuvering the film within the pocket;
  contacting the film; and
  maneuvering the film into a predetermined position within the pocket.

15. The method as recited in claim 14, wherein the maneuvering step comprises the step of positioning the film between the slit and the third bonding line for providing an unobscured view of the film, the unobscured view useful in making contact prints of the film image portions.

16. The method as recited in claim 14, wherein the maneuvering step comprises the step of positioning an end of the film into the flap for locking the film in place within the pocket.

17. The method as recited in claim 14, further comprising the steps of:
placing the film within a protective sleeve;
dimensioning the pockets for receiving and holding the protective sleeve containing the film.

18. The method as recited in claim 14, further comprising the steps of:
providing a forth bonding line proximate an edge of the sheet for accommodating a hanger bar;
placing a hanger bar between the base and cover sheets along the forth bonding line; and
suspending the holder from the hanger bar.

19. The method as recited in claim 14, further comprising the step of providing a set of fifth bonding lines proximate the first openings for holding the film between the slit and the third bonding lines, the fifth bonding lines proximate one of the first bonding lines forming one pocket, the fifth bonding line reducing the dimension of the first opening first opening to a reduced dimension sufficient for receiving the film.

20. The method as recited in claim 14, further comprising the step of punching holes along an edge of the sheets for communicating with fasteners of a binder.

21. The method as recited in claim 14, further comprising the step of forming the sheets from synthetic polymer material selected from the group consisting of polypropylene, polyester, and polyethylene.

22. The method as recited in claim 14 further comprising the step of forming the sheets from the group consisting of translucent material, semitransparent material, and transparent material.

23. A film archival storage holder, comprising:
a light transmitting base sheet, the sheet formed from material sufficiently flexible for protecting and maneuvering film into pockets formed with the base sheet;
a light transmitting cover sheet affixed to the base sheet along bonding lines, the cover sheet formed from flexible material sufficiently flexible for protecting and maneuvering film into pockets formed with the cover sheet, the cover sheet overlaying a face of the base sheet thereby forming a laminar page structure;
a set of pocket bonding lines equally spaced from each other, the pocket bonding line set forming a set of pockets between the base and cover sheets, the pockets dimensioned for receiving and holding a film having a width dimension and a length dimension, the film having a central image portion positioned between marginal side portions, the pocket bonding lines forming first and second openings at each end of the pockets;
a set of access bonding lines at each of the second openings, the access bonding lines reducing a dimension of the second opening thereby preventing the film from passing therethrough, the reduced second opening permitting access to the pocket for maneuvering the film within a pocket; and
a set of locking bonding lines proximate the first openings for holding the negative film between a locking bonding line and an access bonding line thereby holding a film within an unobscured portion of a pocket, the locking bonding lines proximate a corresponding one of the pocket bonding lines forming one pocket, the locking bonding line reducing the dimension of the first opening to a dimension sufficient for receiving the film.

24. The holder as recited in claim 23, further comprising:
a bonding line orthogonal to the set of pocket bonding lines, the orthogonal bonding line proximate the first opening, the orthogonal bonding line positioned away from first ends of the set of pocket bonding lines thereby forming a gap between the first ends and the orthogonal bonding line; and
a flap for locking the film in place within each pocket formed by a slit through the cover sheet, the slit parallel to and separated from the orthogonal bonding line, the slit positioned within the gap proximate the set of pocket bonding line ends, the slit providing access to the pocket first openings for placing the film into the pockets.

25. The holder as recited in claim 23, wherein the pocket is dimensioned for receiving and holding a protective sleeve containing the film.

26. The holder as recited in claim 23, further comprising a hanger bonding line proximate an edge of the sheet, the hanger bonding line forming a channel between the sheets for accommodating a hanger bar useful in suspending the holder.

27. The holder as recited in claim 23, further comprising means for removably affixing the holder within a binder.

28. The holder as recited in claim 23, wherein the sheets are formed from synthetic polymer material selected from the group consisting of polypropylene, polyester, and polyethylene.

29. The holder as recited in claim 23, wherein the sheets are formed from the group consisting of translucent material, semitransparent material, and transparent material.

* * * * *